United States Patent [19]

Onizuka

[11] Patent Number: 4,536,633

[45] Date of Patent: Aug. 20, 1985

[54] DIELECTRIC FLUID FOR ELECTRICAL DISCHARGE MACHINING

[75] Inventor: Masahiro Onizuka, Aichi, Japan

[73] Assignee: Mitsubishi Denki Kabushiki Kaisha, Tokyo, Japan

[21] Appl. No.: 558,708

[22] Filed: Dec. 7, 1983

Related U.S. Application Data

[63] Continuation of Ser. No. 233,368, Feb. 11, 1981, abandoned.

[30] Foreign Application Priority Data

Feb. 18, 1980 [JP] Japan .................................. 55-18659
Feb. 18, 1980 [JP] Japan .................................. 55-18660
Feb. 18, 1980 [JP] Japan .................................. 55-18661

[51] Int. Cl.³ .............................................. B23P 1/16
[52] U.S. Cl. .............................. 219/69 D; 219/69 M; 252/521
[58] Field of Search ........................ 219/69 D, 69 M; 252/521

[56] References Cited

U.S. PATENT DOCUMENTS

| | | | |
|---|---|---|---|
| 2,884,313 | 4/1959 | Browne | 219/69 D |
| 2,996,602 | 8/1961 | Webb | 219/69 D |
| 3,168,638 | 2/1965 | Riddles | 219/69 D |

FOREIGN PATENT DOCUMENTS 3102207 11/1981 Fed. Rep. of Germany ... 219/69 D

OTHER PUBLICATIONS

Metals Handbook, vol. 3, p. 5, (1967).
Union Carbide, Synthetic Organic Chemicals, p. 30, (1940).

*Primary Examiner*—John D. Welsh
*Attorney, Agent, or Firm*—Sughrue, Mion, Zinn, Macpeak & Seas

[57] ABSTRACT

A dielectric fluid for electrical discharge machining which contains an ester solution. The dielectric fluid presents no fire hazard during use due to a high flash point, low combustibility and the fact that it is not easily ionizable. In addition, the dielectric is not malodorous and not toxic. The invention also encompasses a method for EDM machining using this dielectric fluid.

28 Claims, No Drawings

DIELECTRIC FLUID FOR ELECTRICAL DISCHARGE MACHINING

This application is a continuation, of application Ser. No. 233,368, filed Feb. 11, 1981, now abandoned.

BACKGROUND OF THE INVENTION

The present invention relates to a dielectric fluid particularly intended for use in electrical discharge machining.

As is well known, electrical discharge machining (EDM) can be performed either by a diesinking method using a die electrode or a wire cutting method using a wire electrode. In either method, a workpiece spaced by a predetermined distance, called a machining gap, from a machining electrode and immersed in a dielectric fluid bath is machined by the action of a spark discharge generated between the electrode and workpiece. The dielectric fluid is rapidly vaporized and evaporated in the spark column to provide a high pressure that blows off molten portions of the workpiece while at the same time the unvaporized fluid cools the metal particles removed from the workpiece and removes work chips and decomposed carbon from the machining gap.

Electrical discharge machining with a wire electrode involves little fire hazard since water is generally used as the dielectric fluid. However, the dielectric used in the diesinking method is generally an inflammable oil such as a mineral oil since only a low machining speed can be achieved with water. With the use of inflammable oils, if the level of the dielectric in the bath drops below a certain safe level, a fire may be caused by the discharge sparks. Therefore, many precautions must be undertaken to provide a safe and reliable machining system. However, observance of the strictest controls upon the use of inflammable oils does not assure complete safety if unattended EDM operations are carried out over many hours. Moreover, mineral oils typically used for EDM operations have a disagreeable odor. Another problem with mineral oils is that they tend to cause skin rashes if the hands of the operator should accidentally come into contact with the oil. It has been proposed to eliminate the fire hazard by using a nonflammable oil such as silicone oil, fluorinated oil or chlorinated oil as the dielectric for EDM but silicone and fluorinated oils are too expensive to be economically feasible and chlorinated oil is toxic.

SUMMARY OF THE INVENTION

Therefore, one object of the invention is to provide a dielectric fluid for EDM that is nonflammable and provides good machining performance.

Another object of the invention is to provide a dielectric fluid for EDM that does not present a fire hazard during unattended operation of the EDM machine.

A further object of the invention is to provide a dielectric fluid for EDM that is not malodorous, not toxic and has no ill effect on the working environment.

Still another object of the invention is to provide a dielectric fluid for EDM that is inexpensive and easily available.

A further object of the invention is to provide a dielectric fluid for EDM that minimizes the wear of the machining electrode.

These objects of the invention are achieved by the provision of an ester solution in the dielectric fluid in which the machining electrode and workpiece which are spaced apart by a preset machining gap are immersed. Preferably, the ester solution is an aqueous solution and one which is not easily ionizable and which has a high flash point.

Otherwise, the invention may be practiced by the use as a dielectric fluid for electrical discharge machining of an aqueous solution of acetate ester having a high flash point, preferably higher than 100° C. The acetate ester, specifically, may be a compound selected from among diethylene glycol monoethyl ester acetate, ethylene glycol acetate, diethylene glycol monoethyl ether acetate, methoxytriethylene glycol acetate and diethylene glycol diacetate. Diethylene glycol monoethyl ether acetate should have a concentration of less than 50 vol %. If desired, a corrosion inhibitor and a surfactant can be added to the fluid.

Still further, an aqueous solution of carbonate ester having a high flash point can be used as the dielectric fluid, again having a flash point preferably higher than 100° C. The carbonate ester may be selected from among the group consisting of ethylene carbonate and propylene carbonate, wherein, in the case of the former, the concentration should be less than 70 wt %.

Yet further, the invention can be practiced by the use for a dielectric fluid in electrical discharge machining composed of a phosphate ester of the general formula $PO(OR)_3$ in which R is an alkyl group having 1 to 8 carbon atoms. Preferably, the phosphate ester is in an aqueous solution and is a material selected from among triethyl phosphate, triphenyl phosphate and tributyl phosphate.

DESCRIPTION OF THE PREFERRED EMBODIMENTS

The invention is characterized by the use of an ester solution in the dielectric fluid for EDM. The preferred ester solution is water-soluble, has a high flash point, for example, higher than 100° C., is difficult to ignite and is not easily ionizable for causing a discharge. When such a dielectric fluid is employed, the machining speed may be slightly lower than obtained with an ordinary dielectric fluid such as kerosene. On the other hand, with the use of ester solution, wear of the machining electrode is reduced and the fire hazard involved with the use of kerosene is eliminated.

A preferred embodiment of an ester solution used in the dielectric fluid for EDM is an aqueous solution of acetate ester having high flash point. Acetate ester is water-soluble and a mixture of acetate ester with water becomes uniform solution by simply by stirring the mixture for about one minute.

To test the combustability of the aqueous solution of acetate ester, a burning test was conducted with aqueous solutions of varying concentrations of diethylene glycol monoethyl ether acetate in a crucible by igniting a glass wick in the solution with a Bunsen burner. The test results are shown in Table 1.

TABLE 1

| Conc. of diethylene glycol monoethyl ether acetate | Result |
| --- | --- |
| 90% (by Vol.) | burned continuously |
| 80% | burned continuously |
| 70% | burned slightly |
| 60% | ignited but quickly went out |
| 50% | did not ignite |
| 40% | did not ignite |

As Table 1 shows, inflammable acetate ester has a self-extinguishing property when it is in the form of an aqueous solution of a concentration lower than a certain value. An acetate ester having a flash point higher than 100° C. is preferably used. The reason for this is that, since the temperature of the dielectric sometimes increases to as high as 50°-60° C. during EDM machining, the vapor of the acetate ester generated may ignite if it has a low flash point. However, if the flash point is higher than 100° C., the acetate ester in aqueous solution will not reach the flash point and hence will not ignite before all water in the solution is lost through evaporation.

An acetate ester solution in a noncombustible concentration was used as the dielectric in EDM machining of quenched steel using copper as the machining electrode. The acetate ester solution was composed of 40 vol % of diethylene glycol monoethyl ether acetate and 60 vol % of water. A machining speed of 1.7 g/min was achieved. This value is favorably comparable to the 1.8 g/min machining speed achieved with the conventional mineral oil dielectric used under the same conditions. The surface of the workpiece was better than that obtainable with the use of mineral oil dielectric because the dielectric of the invention performs some electrolytic action. When a 30% aqueous solution of acetate ester was used as the dielectric, the wear of the machining electrode was smaller than when kerosene was used as the dielectric.

Similar results were obtained when the dielectric fluid was composed of other acetate esters such as ethylene glycol acetate, diethylene glycol monomethyl ether acetate, methoxytriethylene glycol acetate, and diethylene glycol diacetate. The workpiece may corrode if many hours of EDM machining is performed with a dielectric composed of these acetate esters. However, this can be prevented simply by adding a corrosion inhibitor. Advantageously, with the use of the dielectric of the invention, while making a deep hole, work chips can be easily removed by reducing the surface tension of the dielectric with a surfactant.

The dielectric fluid of the invention composed of a nonflammable aqueous solution of acetate ester eliminates the chance of fire due to an error during EDM operation and hence makes possible unattended operation that results in significant labor cost savings. The dielectric of the invention is odorless and does not cause skin rashes. Because of these safety and hygenic features, the dielectric fluid of the invention is very simple to use in EDM.

Another preferred embodiment of a dielectric fluid of the present invention is an aqueous solution of carbonate ester. A carbonate ester is water-soluble and a mixture of carbonate ester with water becomes uniform by simply by stirring the mixture for about one minute. To test the combustibility of the aqueous solution of carbonate ester, a burning test was conducted with aqeous solutions of varying concentrations of ethylene carbonate in a crucible by igniting a glass wick in the solutions with a Bunsen burner. The test results are shown in Table 2.

TABLE 2

| Conc. of ethylene carbonate | Result |
| --- | --- |
| 80% (by wt.) | ignited but quickly extinguished |
| 70% | did not ignite |
| 60% | " |
| 50% | " |

TABLE 2-continued

| Conc. of ethylene carbonate | Result |
| --- | --- |
| 40% | " |

As Table 2 shows, inflammable carbonate ester has a self-extinguishing property when it is in the form of an aqueous solution of a concentration lower than a certain value. A carbonate ester having a flash point higher than 100° C. is preferably used. The reason for this is that, since the temperature of the dielectric sometimes increases to as high as 50°-60° C. during EDM machining, the vapor of the carbonate ester generated may ignite if it has a low flash point. However, if the flash point is higher than 100° C., the carbonate ester in aqueous solution will not reach that flash point and hence will not ignite before all water in the solution is lost through evaporation.

A carbonate ester solution in a noncombustible concentration was used as the dielectric in EDM machining of quenched steel using copper as the machining electrode. The carbonate ester solution was composed of 40 wt % of ethylene carbonate and 60 wt % of water. A machining speed of 1.6 g/min was achieved which was favorably comparable to the 1.8 g/min speed achieved by the conventional mineral oil dielectric used under the same conditions. The surface of the workpiece was better than that obtainable with the use of mineral oil dielectric because the dielectric of the invention performs some electrolytic action.

Similar results were obtained when the dielectric fluid was composed of other carbonate esters such as propylene carbonate. The workpiece may corrode if many hours of EDM machining is performed with a dielectric composed of propylene carbonate. However, this can be prevented simply by adding a corrosion inhibitor. Moreover, while making a deep hole, work chips can be easily removed by reducing the surface tension of the dielectric with a surfactant.

A third preferred embodiment of an ester solution used in a dielectric fluid for EDM machining in accordance with the invention is a phosphate ester or an aqueous solution of phosphate ester. To test the combustibility of such phosphate ester, a burning test was conducted with a phosphate ester in a crucible by igniting a glass wick in the ester. The ester did not ignite at all.

Phosphate esters, specifically triethyl phosphate and triphenyl phosphate, and a 40 vol % aqueous solution of triethyl phosphate were used as dielectrics in EDM of quenched steel using copper as the machining electrode. Most broadly phosphate esters of the general formula $PO(OR)_3$ in which R is an alkyl group having 1 to 8 carbon atoms can be used. The machining speeds achieved by the respective dielectric fluids are shown in Table 3 together with the speed achieved by a conventional mineral oil dielectric.

TABLE 3

| Dielectric | Machining speed |
| --- | --- |
| Triethyl phosphate | 1.7 g/min |
| Triphenyl phosphate | 1.8 |
| 40 vol % Aqueous Triethyl phosphate | 1.6 |
| Mineral oil | 1.8 |

As Table 3 shows, the dielectric fluids containing phosphate esters achieved machining speeds favorably comparable to the speed achieved by the conventional mineral oil dielectric. The surface of the workpiece machined in the dielectric composed of an aquoues solution of water-soluble phosphate ester was better than that obtainable with the use of mineral oil dielectric because the former performs some electrolytic action.

Similar results were obtained when triethyl phosphate and triphenyl phosphate were replaced by tributyl phosphate and oils containing phosphate ester.

To further prove the efficacy of the present invention, tests were conducted in which a workpiece was machined utilizing various dielectric fluids of the invention including diethylene glycol monoethyl ether acetate, diether carbonate and triethyle phosphate. As a comparison, similar machining operations were performed using kerosene as the dielectric fluid. During these tests, the amount of wear of the machining electrode was measured and the wear ratio with respect to kerosene was calculated. These tests were performed under two conditions. For Condition 1, a peak current of 60 A was used with a pulse on time of approximately 120 $\mu$sec and a 50% duty cycle. For Condition 2, a peak current of 60 A and a duty factor of 50% was utilized but with a pulse on time of approximately 2000 $\mu$sec. The results of these tests are presented below in Table 4.

TABLE 4

| Electrical discharge machining fluid | | Kerosene | Machining fluid of the invention | | |
|---|---|---|---|---|---|
| | | | Diethylene glycol monoethyl ether acetate | Diethyl carbonate | Triethyl phosphate |
| Condition 1 | Amount of wear of electrode (g/min) | 0.104 | 0.017 | 0.014 | 0.029 |
| | Wear ratio with respect to kerosene (%) | 100 | 16.5 | 13.5 | 28.0 |
| Condition 2 | Amount of wear of electrode (g/min) | 0.866 | 0.131 | 0.077 | 0.588 |
| | Wear ratio with respect to kerosene (%) | 100 | 15.0 | 9.0 | 68.0 |

NOTE:
All fluids of invention are 30 wt % concen.

What is claimed is:

1. A dielectric fluid comprising a non-combustible aqueous solution of an ester having a high flash point used as a dielectric fluid in electrical discharge machining, wherein said ester is selected from the group consisting of acetate ester, carbonate ester and phosphate ester of the formula PO(OR)$_3$ wherein R is an alkyl group of 1 to 8 carbon atoms or an aryl group, and wherein said dielectric fluid has a machining electrode immersed therein.

2. The dielectric fluid according to claim 1 wherein said ester solution comprises an ester solution which is not easily ionizable.

3. The dielectric fluid according to claim 1 wherein said acetate ester has a flash point higher than 100° C.

4. The dielectric fluid according to claim 1 wherein said acetate ester comprises at least one compound selected from the group consisting of diethylene glycol monoethyl ether acetate, ethylene glycol acetate, diethylene glycol monomethyl ether acetate, methoxytriethylene glycol acetate and diethylene glycol diacetate.

5. The dielectric fluid according to claim 4 wherein said aqueous solution comprises diethylene glycol monoethyl ether acetate in a concentration of less than 50 vol %.

6. The dielectric fluid according to claim 1 wherein said aqueous solution of acetate ester further comprises a corrosion inhibitor.

7. The dielectric fluid according to claim 1 wherein said aqueous solution of acetate ester further comprises a surfactant.

8. The dielectric fluid according to claim 1 wherein said carbonate ester has a flash point higher than 100° C.

9. The dielectric fluid according to claim 1 wherein said carbonate ester is selected from the group consisting of ethylene carbonate and propylene carbonate.

10. The dielectric fluid according to claim 9 wherein said aqueous solution comprises ethylene carbonate in a concentration of less than 70 wt %.

11. The dielectric fluid according to claim 1 wherein said dielectric fluid comprises an aqueous solution of said phosphate ester.

12. The dielectric fluid according to claim 1 or 11 wherein said phosphate ester is selected from the group consisting of triethyl phosphate, triphenyl phosphate and tributyl phosphate.

13. A method comprising the steps of immersing a workpiece in an aqueous ester solution and electrical discharge machining said workpiece.

14. The method according to claim 13 wherein said ester comprises an ester solution which is not easily ionizable.

15. The method according to claim 14 wherein said ester solution comprises an ester solution having a high flash point.

16. A method comprising the steps of immersing a workpiece in an aqueous solution of acetate ester having a high flash point and electrical discharge machining said workpiece.

17. The method according to claim 16 wherein said acetate ester has a flash point higher than 100° C.

18. The method according to claim 16 wherein said acetate ester comprises at least one compound selected from the group consisting of diethylene glycol monoethyl ether acetate, ethylene glycol acetate, ethylene glycol monomethyl ether acetate, methoxytriethylene glycol acetate and diethylene glycol diacetate.

19. The method according to claim 18 wherein said acetate ester comprises diethylene glycol monoethyl ether acetate in a concentration of less than 50 vol %.

20. The method according to claim 16 wherein said aqueous solution of acetate ester further comprises a corrosion inhibitor.

21. The method according to claim 16 wherein said aqueous solution of acetate ester further comprises a surfactant.

22. A method comprising the steps of immersing a workpiece in an aqueous solution of carbonate ester having a high flash point and electrical discharge machining said workpiece.

23. The method according to claim 22 wherein said carbonate ester comprises a carbonate ester having a flash point higher than 100° C.

24. The method according to claim 23 wherein said carbonate ester is selected from the group consisting of ethylene carbonate and propylene carbonate.

25. The method according to claim 24 wherein the concentration of said ethylene carbonate is less than 70 wt %.

26. A method comprising the steps of immersing a workpiece in a phosphate ester of the formula PO(OR)$_3$ wherein R is one of an alkyl group having 1 to 8 carbon atoms and electrical discharge machining said workpiece.

27. The method according to claim 26 wherein said dielectric fluid comprises an aqueous solution of said phosphate ester.

28. The method according to claim 26 or 27 wherein said phosphate ester is selected from the group consisting of triethyl phosphate, triphenyl phosphate and tributyl phosphate.

* * * * *